United States Patent
Zhou et al.

(10) Patent No.: US 9,876,638 B2
(45) Date of Patent: Jan. 23, 2018

(54) SYSTEM AND METHOD FOR COMPRESSED LEVEL-ORDERED EDGE SEQUENCE ENCODING

(75) Inventors: Rong Zhou, San Jose, CA (US); Tim C. Schmidt, Campbell, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/531,290

(22) Filed: Jun. 22, 2012

(65) Prior Publication Data

US 2013/0346451 A1    Dec. 26, 2013

(51) Int. Cl.
G06F 17/30 (2006.01)
H04L 9/08 (2006.01)
H04L 9/00 (2006.01)

(52) U.S. Cl.
CPC ...... *H04L 9/0836* (2013.01); *G06F 17/30327* (2013.01); *H04L 9/00* (2013.01); *G06F 17/30625* (2013.01); *G06F 17/30961* (2013.01); *G06F 17/30985* (2013.01)

(58) Field of Classification Search
CPC ......... G06F 17/30327; G06F 17/30961; G06F 17/30625; G06F 17/30985; G06F 17/30911; G06F 17/3033; G06F 17/30958; G06F 17/30321; Y10S 707/99942
USPC ....... 707/797, 758, 706, 713, 737, 741, 745, 707/769, 790, 795, 798
See application file for complete search history.

(56) References Cited

U.S. PATENT DOCUMENTS

| | | | |
|---|---|---|---|
| 6,694,323 B2 * | 2/2004 | Bumbulis | 707/999.101 |
| 6,910,043 B2 * | 6/2005 | Iivonen | G06F 17/30958 |
| | | | 707/999.003 |
| 7,599,946 B2 * | 10/2009 | Hsieh et al. | 707/999.1 |
| 7,610,284 B2 * | 10/2009 | Lee | 707/999.006 |
| 8,065,308 B2 * | 11/2011 | Shadmon | G06F 17/30911 |
| | | | 707/741 |
| 8,380,758 B1 * | 2/2013 | Stephens | G06F 9/45512 |
| | | | 370/392 |
| 8,457,419 B2 * | 6/2013 | Lamb | H04N 19/60 |
| | | | 341/63 |
| 8,495,093 B2 * | 7/2013 | Baudel | G06F 17/30327 |
| | | | 707/790 |
| 8,631,043 B2 * | 1/2014 | Hao | G06F 17/30958 |
| | | | 707/796 |
| 8,725,509 B1 * | 5/2014 | Harb | G10L 15/183 |
| | | | 704/10 |
| 8,923,298 B2 * | 12/2014 | Wang | H04L 45/748 |
| | | | 370/392 |
| 9,361,578 B2 | 6/2016 | Schmidt et al. | |

(Continued)

FOREIGN PATENT DOCUMENTS

| | | |
|---|---|---|
| JP | 2004-289284 A | 10/2004 |
| JP | 2011-257877 A | 12/2011 |
| WO | WO 2011/129052 A1 | 10/2011 |

OTHER PUBLICATIONS

Trie, Wikipedia, XP002713829, pp. 1-9, retrieved from the Internet Sep. 27, 2013.

(Continued)

*Primary Examiner* — Dangelino Gortayo
(74) *Attorney, Agent, or Firm* — Fay Sharpe LLP

(57) ABSTRACT

Compressed Level-Ordered Edge Sequence (CLOES) encodings are described. These techniques enable more aggressive compression of a state-set representation.

14 Claims, 18 Drawing Sheets

(56) References Cited

U.S. PATENT DOCUMENTS

| | | | | |
|---|---|---|---|---|
| 2005/0149513 A1* | 7/2005 | Karlsson | ........... | G06F 17/30961 707/999.003 |
| 2006/0288024 A1* | 12/2006 | Braica | ........................... | 707/101 |
| 2009/0077076 A1* | 3/2009 | Berger et al. | ..................... | 707/6 |
| 2012/0005234 A1* | 1/2012 | Tago | ................ | G06F 17/30625 707/797 |

OTHER PUBLICATIONS

Ravindra Guravannavar et al., "Reducing Order Enforcement Cost in Complex Query Plans," Data Engineering, IEEE 23$^{rd}$ International Conference, XP03195829, pp. 856-865, Apr. 1, 2007.

European Search Report for 13170391.0 dated Sep. 27, 2013.

Joseph C. Culberson et al., "Pattern Databases," Computational Intelligence, vol. 14, No. 3, pp. 318-334, 1998.

Klaus Drager et al., "Directed Model Checking with Distance-Preserving Abstractions," 13$^{th}$ International SPIN Workshop, Vienna, Austria, pp. 19-34, 2006.

Stefan Edelcamp, "Symbolic Pattern Databases in Heuristic Search Planning," Proceedings of the 6$^{th}$ International Conference on AI Planning and Scheduling, pp. 274-283, 2002.

Patrik Haslum et al., "Domain-Independent Construction of Pattern Database Heuristics for Cost-Optimal Planning," Proceedings of the National Conference on Artificial Intelligence, vol. 22, 1007, pp. 1007-1012, 2007.

Malte Helmert et al., "Flexible Abstraction Heuristics for Optimal Sequential Planning," Proc. ICAPS, vol. 2007, pp. 176-183, 2007.

Malte Helmert, "The Fast Downward Planning System," Journal of Artificial Intelligence Research, 26, pp. 191-246, 2006.

Rune M. Jensen et al., SetA*: An Efficient BDD-Based Heuristic Search Algorithm, Proceeding of the 18$^{th}$ National Conference on Artificial Intelligence, pp. 668-673, 2002.

Richard E. Korf, "Depth-First Iterative-Deepening: An Optimal Admissible Tree Search," Artificial Intelligence, pp. 97-109, 1985.

Tim Schmidt et al., "Succinct Set-Encoding for State-Space Search," Proceedings of the Twenty-Fifth AAAI Conference on Artificial Intelligence, pp. 87-92, 2011.

* cited by examiner

SYSTEM AND METHOD FOR COMPRESSED LEVEL-ORDERED EDGE SEQUENCE ENCODING

CROSS REFERENCE TO RELATED PATENTS AND APPLICATIONS

This application is related to U.S. application Ser. No. 13/181,585, filed Jul. 13, 2011, entitled "Memory Efficient State-Set Representation for Planning," and naming Rong Zhou and Tim Schmidt as inventors.

BACKGROUND

A key challenge for applying memory-based search heuristics, such as pattern databases (Culberson J., and Schaeffer, J., Pattern databases, Computational Intelligence 14(3): 318-334 (1998)) and merge & shrink abstractions (Drager, K., Finkbeiner, B., and Podelski, A., Directed model checking with distance-preserving abstractions; In Model checking software: $13^{th}$ International SPIN Workshop, Vienna, Austria, March 30-Apr. 1, 2006, proceedings, 19, Springer-Verlag New York Inc. (2006); Helmert, M., Haslum, P., and Hoffmann, J., Flexible abstraction heuristics for optimal sequential planning, In Proc. ICAPS, volume 2007, 176-183 (2007)), to domain-independent planning is succinct representation. The performance of these heuristics usually improves with the size of their underlying data, as well as the efficiency with which they can be accessed, with subsequent consequences to their memory requirements. The problem is exacerbated when employing best-first search algorithms with duplicate detection such as A*, since these algorithms are usually limited by the amount of available memory, a deciding factor for problem solvability.

Linear-space search algorithms such as IDA* (Korf, R., Depth-first iterative-deepening: An optimal admissible tree search, Artificial intelligence (1985)) use much less memory than A* but by foregoing duplicate detection, they pay the price of extra node expansions to find optimal solutions. This time-space tradeoff pays off in domains with few duplicates such as the sliding-tile puzzles where IDA* easily outperforms A*, but many domains (e.g. multiple sequence alignment) are not conducive to this approach. Hence current state-of-the-art heuristic search planners such as Fast Downward (Helmert, M., The fast downward planning system, Journal of Artificial Intelligence Research 26 (2006): 191-246 (2006)), HSP_F and Gamer include duplicate detection.

Perfect hashing is a popular technique used to associate subproblems to precomputed solutions. Here, an (injective) enumerating function assigns each subproblem a unique id that is typically used to address a record in a random access structure. However, in domain-independent planning, it is often infeasible to find a function that is also nearly surjective, particularly when dealing with complex subproblems. This quickly leads to excessive amounts of unused slots in the data array, relegating the approach to simple subproblems.

Another approach to representing pattern databases is to use BDDs (Edelkamp, S., Symbolic pattern databases in heuristic search planning, In Proceedings of the $6^{th}$ International Conference on AI Planning and Scheduling (AIPS-02), 274-283 (2002)). An (ordered and reduced) BDD is a canonical graph-based representation of a binary function that, through merging isomorphic sub-graphs, is often very space efficient. State-sets can be mapped to binary functions straightforwardly and BDDs have been successfully used in planning and model checking (Jensen, R., Bryant, R., and Veloso, M., SetA*: An efficient bdd-based heuristic search algorithm, In Proceedings of the $18^{th}$ National Conference on Artificial Intelligence (AAAI-02), 668-673 (2002)). One problem for domain-independent planning is that the space efficiency of these approaches can vary widely depending on the structure of the underlying domain. Another problem is that BDDs are not well suited for associating data with individual states in a space efficient way. This is usually less of a problem for pattern databases, as often, a significant number of patterns is associated with the same value. Nevertheless, this makes BDDs a challenge to use in more general memoization contexts.

INCORPORATION BY REFERENCE

U.S. application Ser. No. 13/181,585, filed Jul. 13, 2011, entitled "Memory Efficient State-Set Representation for Planning," and naming Rong Zhou and Tim Schmidt as inventors, is incorporated herein by reference in its entirety.

BRIEF DESCRIPTION

In one aspect of the presently described embodiments, a method comprises encoding, by an electronic computing device, a prefix tree representation of a set of states as a level ordered edge sequence (LOES) which encodes each inner tree node from left to right, and top to bottom order as bit pairs, identifying, by the electronic computing device, a presence of a complete subtree within the prefix tree, and denoting, by the electronic computing device, the subtree using a code-point in the encoding.

In another aspect of the presently described embodiments, the code-point is "00."

In another aspect of the presently described embodiments, the method further comprises pruning the complete subtree, except for its root node, from the prefix tree.

In another aspect of the presently described embodiments, the prefix tree is based on a pattern database.

In another aspect of the presently described embodiments, a system comprises an electronic computing device having a memory storage and an electronic processor, wherein the electronic processor is configured to encode a prefix tree representation of a set of states as a level ordered edge sequence (LOES) which encodes each inner tree node from left to right, and top to bottom order as bit pairs, identify a presence of a compete subtree within the prefix tree, and denoting the subtree using a code-point in the encoding.

In another aspect of the presently described embodiments, the code-point is "00."

In another aspect of the presently described embodiments, the electronic computing device is operative to prune the complete subtree, except for its root node, from the prefix tree.

In another aspect of the presently described embodiments, prefix tree is based on a pattern database.

In another aspect of the presently described embodiments, a method comprises decoding by an electronic computing device, a level ordered edge sequence (LOES) code for a binary prefix tree of a set of states, identifying, by the electronic computing device, a presence of a code-point representing a complete subtree within the prefix tree, and returning, by the electronic computing device, a success result indicating a presence of the subtree of the prefix tree.

In another aspect of the presently described embodiments, the code-point is "00."

In another aspect of the presently described embodiments, the prefix tree is based on a pattern database.

In another aspect of the presently described embodiments, the method further comprises constructing, by the electronic computing device, the subtree of the prefix tree.

In another aspect of the presently described embodiments, the constructing is one of implicit or explicit.

In another aspect of the presently described embodiments, a system configured to decode state sets comprises an electronic computing device having a memory storage and an electronic processor, wherein the electronic processor is configured to, decode a level ordered edge sequence (LOES) code for a prefix tree representing a set of states, identify a presence of a code-point representing a complete subtree within the prefix tree, and return a success result indicating a presence of the subtree of the prefix tree.

In another aspect of the presently described embodiments, the code-point is "00."

In another aspect of the presently described embodiments, the prefix tree is based on a pattern database.

In another aspect of the presently described embodiments, the electronic computing device is operative to construct the subtree.

In another aspect of the presently described embodiments, the constructing is one of implicit or explicit.

DETAILED DESCRIPTION

It should be appreciated that the presently described embodiments may have wide application in various technological fields and industrial applications. For example, without limitation, the presently described embodiments may be applied to exploit dynamic programming and other memorization techniques in domain-independent planning, or to enhance and/or implement other planning environments, software model checking routines (e.g. model checking to debug software code), and/or search routines (such as searching in a network of nodes).

Figure 1:
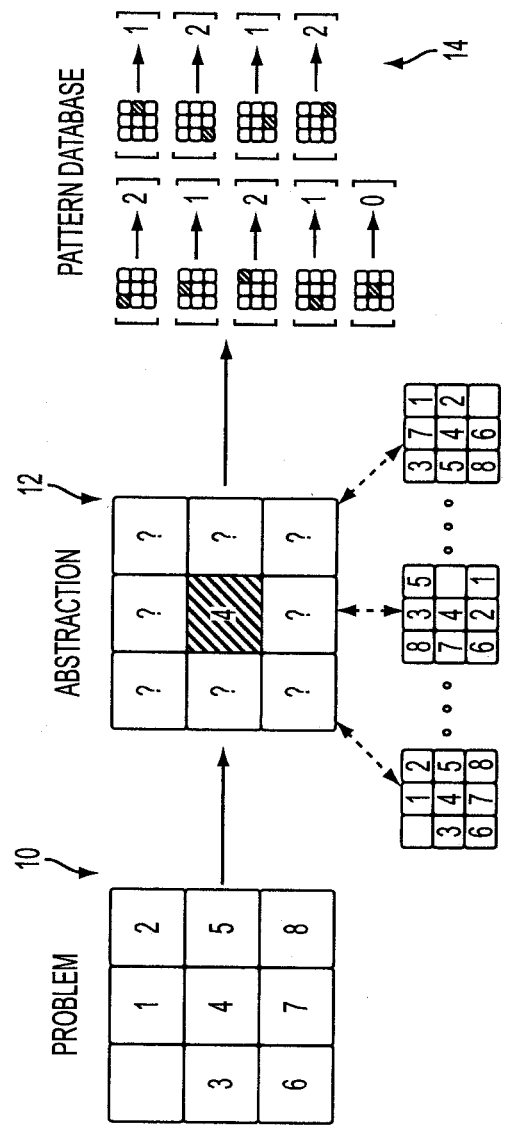
FIG. 1 shows a problem configuration, abstraction and resulting pattern database.

For brevity and clarity, the presently described embodiments will be described in connection with pattern databases, but the ideas presented here transfer rather straightforwardly to other memoization techniques. The idea behind a pattern database heuristic is to first create a (relatively) easy-to-solve abstraction of the original problem. A suitable abstraction must be interpretable as a (usually not invertible) function mapping original problem configurations to their abstract counterparts. An abstract problem configuration is referred to as a pattern. One then solves the abstract problem for all patterns and stores them with the associated costs of their optimal solutions in a database. FIG. 1 provides an example of a problem configuration 10. Informally, we abstract away the identities of all but tile 4 to obtain an abstraction 12. By associating each configuration of the 8-puzzle to the pattern with the matching position of tile 4, this can be interpreted as a many-to-one mapping function. Depicted on the right of FIG. 1, then, is the resulting pattern database 14.

Figure 2:
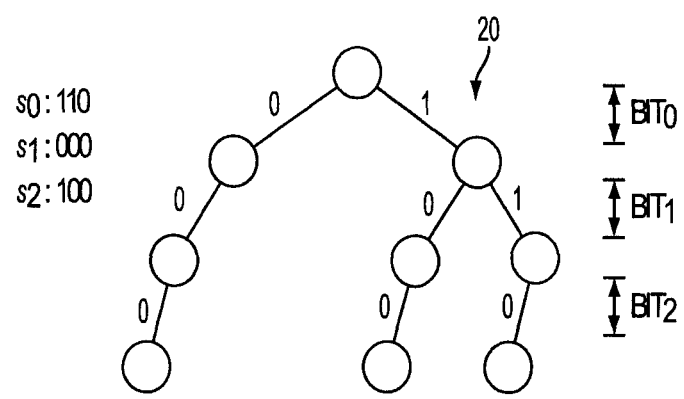
FIG. 2 shows a prefix tree.

According to the presently described embodiments, a level-ordered edge sequence (LOES) representation can be applied to the pattern databases. A LOES encoding scheme is described in U.S. application Ser. No. 13/181,585, filed Jul. 13, 2011, entitled "Memory Efficient State-Set Representation for Planning," which is incorporated herein by reference. Nonetheless, we assume that any pattern (or abstract state) in the database such as the pattern database 14 above, can be encoded in m bits for a given heuristic. Such sets of patterns can be bijectively mapped to edge-labeled binary trees of depth m with labels false and true by mapping each pattern to a path from root to leaf with an edge at tree-depth d corresponding to the value of the bit at offset d in the pattern's bit-string. In this way, every unique pattern results in a unique path and can be reconstructed by the sequence of edge-labels from root to leaf. Henceforth, we refer to these trees as prefix trees, such as binary prefix trees. An example of a prefix tree 20 based on 3-bit sequences ($s_0$, $s_1$, $s_2$) is given in FIG. 2.

Figure 3:
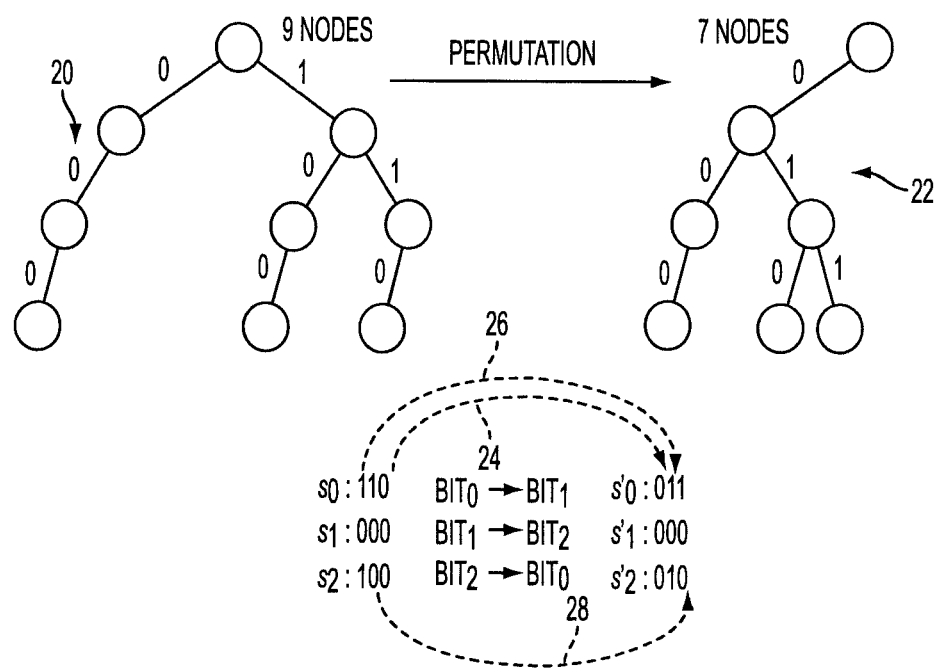
FIG. 3 shows a permutation of a prefix tree of FIG. 2.

A worthwhile preprocessing step is to determine a permutation on the encoding of the patterns that minimizes this prefix tree 20 to a permutated tree 22 (see FIG. 3). A re-ordering of the bits is accomplished to achieve a common prefix "0," resulting in a smaller prefix tree, as shown by lines 24, 26, 28. Methodically sampling the (abstract) state-space and a greedy entropy search through the permutation space based on these samples usually gives good results with little computational effort.

LOES Encoding

Figure 4:
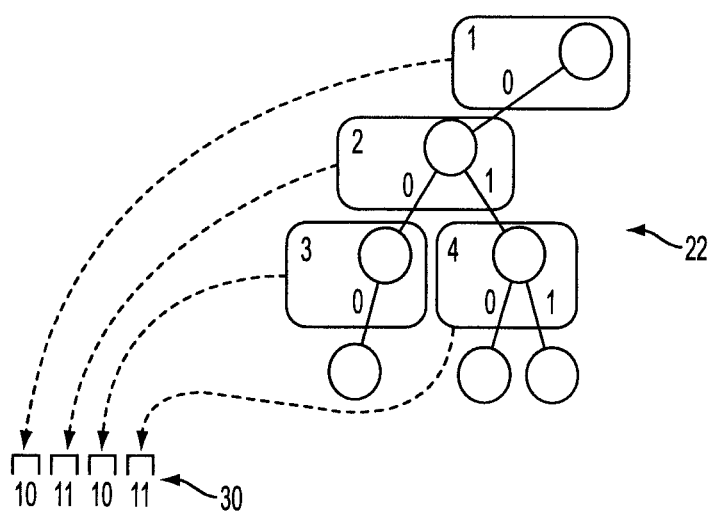
FIG. 4 shows a level-ordered edge sequence (LOES) encoding of the prefix tree of FIG. 3.

LOES allows us to represent prefix trees in (strictly) less than two bits per edge. It is defined as the level-order concatenation of 2-bit edge-pair records for each inner node of the tree (the bits corresponding to the presence of the false and true edges at that node). FIG. 4 shows a level-ordered edge sequence (LOES) for the example set (of FIGS. 2 and 3) to allow encoding an example set in a single byte 30. The encoding results in a bit-string of between 2n and ≈2 nm bits for a set of n states with m bit representation, with the average case usually close to the lower bound. It is to be appreciated that, at least in one form, LOES encoding techniques encode each inner tree node from left-to-right and top-to-bottom as bit pairs.

LOES Navigation

In the LOES encoding, the presence bits for the false and true edges of the node some edge at offset o points to can be found at offsets 2rank(o) and 2rank(o)+1, where rank(i) is a function that gives the number of set bits in the sequence up to (and including) offset i. This follows from the level-order encoding—each preceding edge (with the exception of the leaf level) results in a preceding edge-pair record for the respective target node of that edge. Hence the child record for some edge at offset o will be the rank(o)+1-th record in the sequence (as the root node has no incoming edge). This property allows efficient navigation over the encoded structure.

Rank

Using a two-level index, which logically divides the LOES into blocks of $2^{16}$ bits and sub-blocks of 512 bit, rank can be computed in constant time. For each block, the index holds an 8-byte unsigned integer, denoting the number of set bits from the beginning of the sequence up to the beginning of the block. On the sub-block level, a 2-byte unsigned value stores the number of set bits from the beginning of the corresponding block up to the beginning of the sub-block. The total index size is around 3.3% the size of the LOES code (see Equation 1). Using simple address translations, this reduces the computation to the sum of two table lookups and a straightforward population count in the respective 512 bit sub-block.

$$\underbrace{\frac{64}{2^{16}}}_{block\ index} + \underbrace{\frac{16}{2^9}}_{sub\text{-}block\ index} \approx 0.0323 \qquad (1)$$

---
Algorithm 1: path-offset
---
Input: state a bitsequence of length m
Output: offset an offset into LOES
Data: LOES an encoded state-set
offset ← 0;
for depth ← 0 to m − 1 do
| if state [depth] then
| | offset ← offset + 1;
| end
| if LOES[offset] then
| | if depth = m − 1 then
| | | return offset;
| | end
| | else
| | | offset ← 2rank$_{LOES}$(offset);
| | end
| end
| else
| | return ⊥;
| end
end

---

Figure 5:
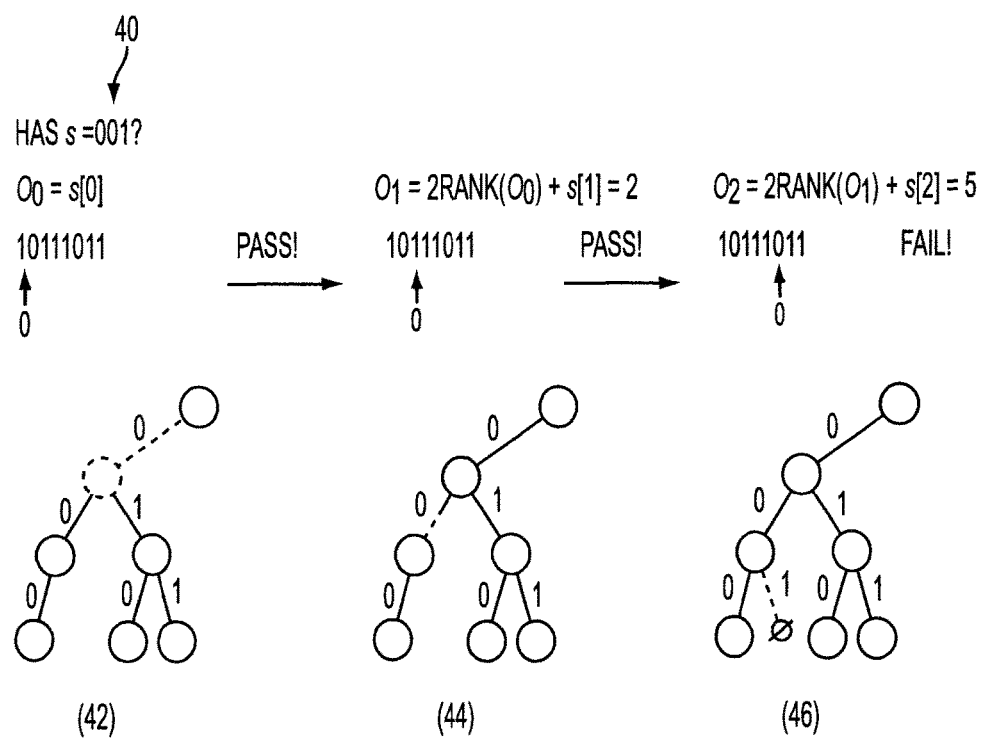
FIG. 5 illustrates a path offset computation.

Member Test. The path-offset function (e.g. Algorithm 1 above) navigates through the LOES from the root according to the label-sequence interpretation of a state. If the state represents a valid path from the tree root to some leaf, the function returns the offset of the bit corresponding to the last edge of the path. Else it evaluates to ⊥. An example is given in FIG. 5 wherein a determination is made whether the state 40 (s=001) is contained in the set of sequences. The path-offset computation for 001, at each level 42, 44, 46 computes the offset of the corresponding edge-presence bit and tests the bit until a fail result is obtained. Otherwise, testing continues upon "pass" results. A set contains a state, if and only if, its path interpretation corresponds to a valid path through the prefix tree and path-offset returns ≠ ⊥.

---
Algorithm 2: member index
---
Input: state a bitsequence of length m
Data: LOES an encoded state-set ---
Algorithm 2: member index
---
Data: levelOffsets array of offsets
o ← path-offset (state );
if o = ⊥ then
| return ⊥;
end
a ← rank$_{LOES}$(o);
b ← rank$_{LOES}$(levelOffsets[m − 1] − 1);
return a − b − 1;

---

Figure 6:
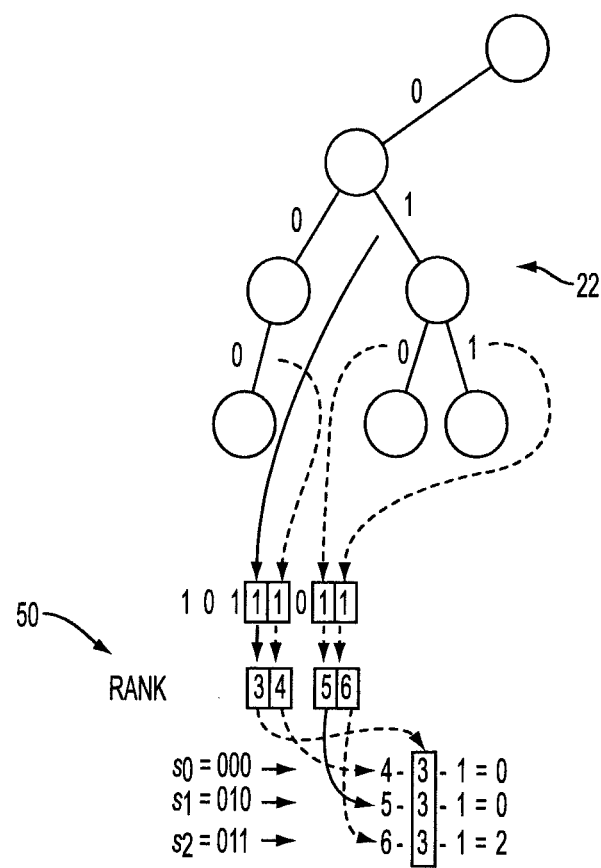
FIG. 6 illustrates an index mapping.

Member Index. Other than efficiently computing member-set tests, the encoding allows to associate consecutive ids $\in \{\bot, 0, \ldots, n-1\}$ for each state in the set. The idea is to compute the rank of the path-offset of a state and normalize this to the [0, n) interval by subtracting the rank of the last offset of the last but one layer +1. Algorithm 2 gives the pseudo-code and FIG. 6 shows this for our example set. In FIG. 6, index mappings are shown for all states of the tree 22 in the example set 50. We substract the rank+1 (of the offset) of the last edge in the last-but-one level from the rank of the path-offset of an element to compute its index.

LOES Construction

Figure 7:
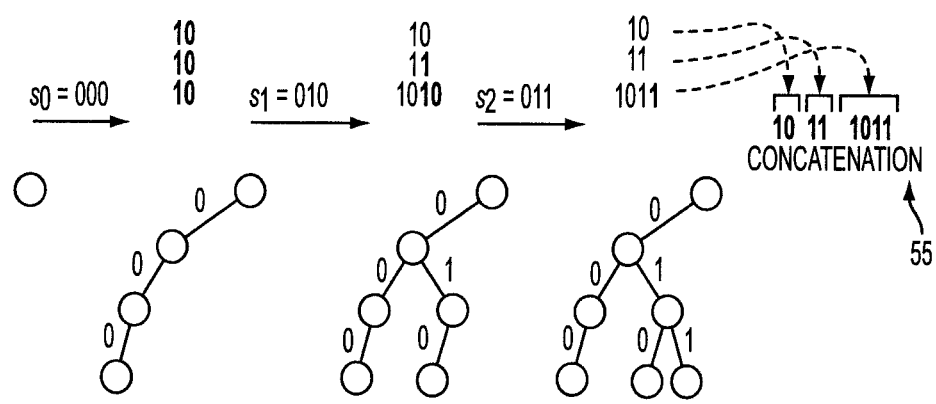
FIG. 7 illustrates construction states when building a LOES code.

With reference to FIG. 7, we now discuss how to construct the LOES code 55 from a sequence of lexicographically ordered states $s_0$, $s_1$, $s_2$. We start with an empty bit-sequence for each layer of the tree. Algorithm 3 and FIG. 7 show how these sequences are manipulated when adding a new state. For the first insertion, we merely append the corresponding records on all levels. For the following insertions, we compute the length of the shared prefix between the inserted state s' and the last state in the code s and set d to the offset of the first differing bit. We set the last bit of sequence for level d to true and then append records according to s to all lower levels. Duplicates (i.e. s=s') are simply ignored. Once we are done with inserting states, the LOES code is constructed by forming the concatenation or code 55 of the sequences in ascending order of their levels.

---
Algorithm 3: add state
---
Input: s a bitsequence of length m
Data: treelevels an array of bitsequences
Data: s' a bitsequence of length m or ⊥
if s' = ⊥ then
| depth ← −1;
end
if s' = s then
| return;
end
else
| depth ← i : ∀j < i, s[j] = s'[j] ∧ s[i] ≠ s'[i];
| treelevels[depth]$_{lastBit}$ ← true;
end
for i ← depth + 1 to m − 1 do
| if s [i] then
| | treelevels[i] ← treelevels[i] o⟨ 01 ⟩;
| end
| else
| | treelevels[i] ← treelevels[i] o⟨ 10 ⟩;
| end
end
s' ← s;

---

PDB Representations

Having introduced the basis of LOES, we now turn our attention to the representation of pattern databases. For brevity, we will not concern ourselves in detail with pattern selection, domain abstraction and the regression search, but will assume a pattern database has already been computed and exists as some collection of pattern-value pairs. These techniques will be apparent to those of skill in the art. Example discussions of these types are included in Haslum, P. et al., Domain-independent construction of pattern database heuristics for cost-optimal planning, In Proceedings of the National Conference on Artificial Intelligence, 1007-1012 (2007), and Helmert M., Haslum, P., and Hoffmann, J., Flexible abstraction heuristics for optimal sequential planning, In Proc. ICAPS 2007, 176-183 (2007).

Combined Layer Sets

According to the presently described embodiments, a basic representation is to convert all patterns into a LOES code. LOES associates a unique id with every unique pattern in the range $\{0, \ldots, |PDB|-1\}$ which we use as an offset to store the associated values in a packed bit-string where each record comprises of the minimal amount of bits necessary to discern between the occurring (in the PDB) values. Computation of the heuristic then comprises of determining the id of the pattern using algorithm 2, and get the value by interpreting id as an offset into the packed bit-string.

Inverse Relation

Figure 8:
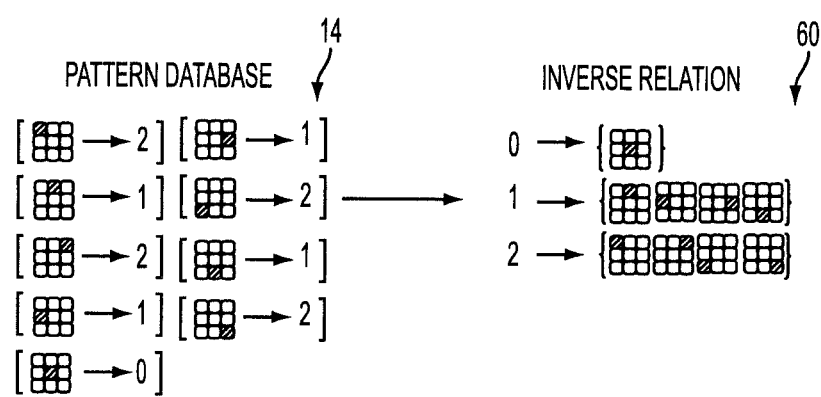
FIG. 8 illustrates an inverse relation for the pattern databases of FIG. 1.

Especially in unit-cost search, the number of patterns in a PDB usually, by far, outstrips the number of different values. We can avoid associating this repetitive data with individual patterns by storing the inverse of the heuristic function. In general, heuristics are not injective, hence, a well-defined inverse does not exist. Instead, the inverse relation (a left-total relation, where every input is associated with multiple outputs) is stored (see FIG. 8 for an example of an inverse relation 60 of a pattern database 14). The heuristic function is then computed through consecutive tests of the pattern against each of the pattern-sets and upon a hit, returning that set's associated value. Note, that due to the function property of the heuristic, these sets are pairwise disjunct. If furthermore, the heuristic is a total function (i.e. the union over all pattern sets comprises the entire abstract pattern space), we can remove the largest of the sets and denote its associated value as a default which we return if the test against all remaining sets fail. The idea is to represent each set as a LOES code. A further optimization is to keep track of the success probabilities of the member-tests over time and query the sets in descending order of these probabilities.

Compressed LOES

| Algorithm 4: comp-add-state |
|---|
| Input: s a bitsequence of length m |
| Data: codes an array of bitsequences |
| Data: s' a bitsequence of length m or ⊥ |
| if s' = ⊥ then |
|   depth ← -1; |
| end |
| if s' = s then |
|   return; |
| end |
| else |
|   depth → i : ∀j < i, s[j] = s'[j] ∧ s[i] ≠ s'[i]; |
|   if depth = m - 1 then |
|     codes[depth]$_{lastRec}$ ← 00; |
|     for i ← depth - 1 to 0 do |
|       if codes[i]$_{lastRec}$ = 11 ∧ codes[i + 1]$_{last2Recs}$ = 0000 then |
|         codes[i]$_{lastRec}$ ← 00; |
|         codes[i + 1].popRecord( ); |
|         codes[i + 1].popRecord( ); |
|       end |
|       else |

-continued

| Algorithm 4: comp-add-state |
|---|
|         break; |
|       end |
|     end |
|   end |
|   else |
|     codes[depth].lastBit ← true; |
|     for i ← depth + 1 to m - 1 do |
|       if s [i] then |
|         codes[i] ← codes[i] o⟨ 01⟩ ; |
|       end |
|       else |
|         codes[i] ← codes[i] o⟨ 10⟩ ; |
|       end |
|     end |
|   end |
|   s' ← s; |
| end |

For the inverse relation representation, we do not need to associate any information with individual states, but only be able to compute set membership. If we encounter a root of a complete subtree during a descend through the prefix tree, we already know that the element in question is present. To exploit this, we developed a variant of LOES, called compressed Level Order Edge Sequence (cLOES), that allows us to omit complete subtrees from the structure by using, for example, a code or code-point. The idea is straightforward—although various codes or code-points may be used, in at least one form, we use the remaining code-point namely 00 (i.e. no further edge at this node) to denote a root of a complete subtree. Note that this does not violate the edge-index child-record-position invariant of LOES. As algorithm 5 shows, the changes to member tests are minimal—whenever we reach a new record, we first test if it denotes a complete subtree (i.e. equals 00) and if so return the current offset. Else the algorithm behaves analogously to LOES as described above.

| Algorithm 5: comp-path-offset |
|---|
| Input: state a bitsequence of length m |
| Output: offset an offset into cLOES |
| Data: cLOES an encoded state-set |
| offset ← 0; |
| for depth ← 0 to m - 1 do |
|   if cLOES[offset, offset + 1] = 00 then |
|     return offset; |
|   end |
|   if state[depth] then |
|     offset ← offset + 1; |
|   end |
|   if cLOES[offset] then |
|     if depth = m - 1 then |
|       return offset; |
|     end |
|     else |
|       offset ← 2rank$_{cLOES}$(offset); |
|     end |
|   end |
|   else |
|     return ⊥; |
|   end |
| end |

Figure 9:
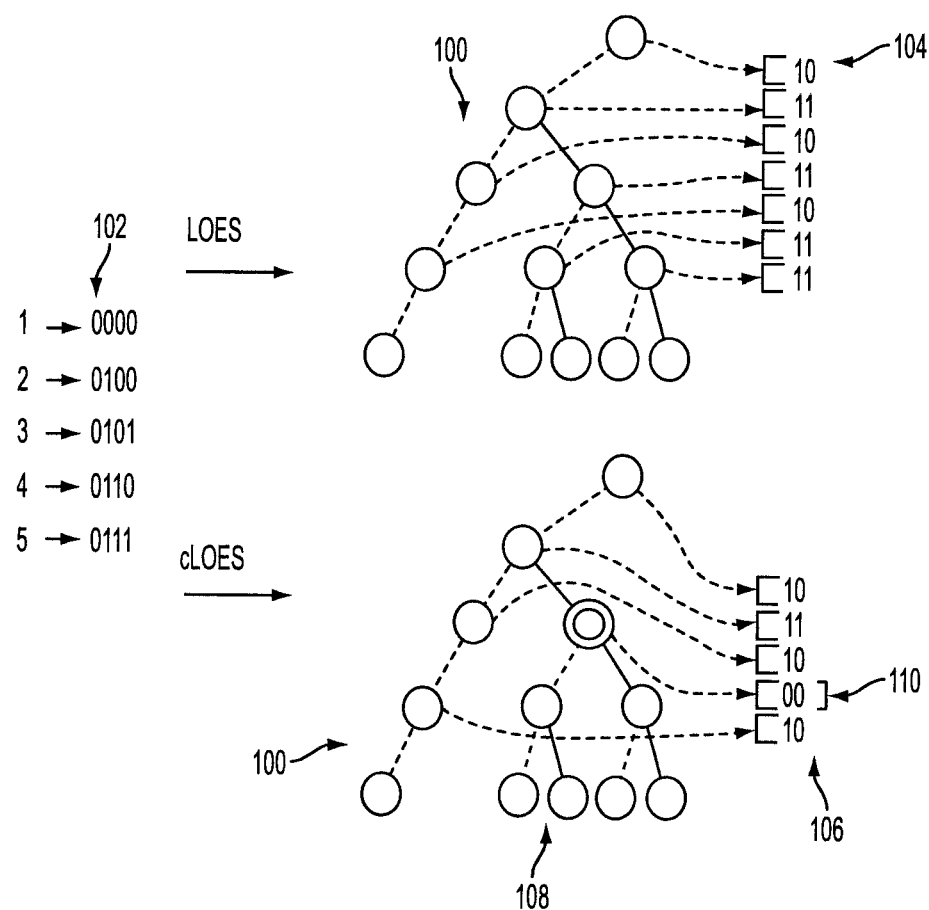
FIG. 9 illustrates compressed LOES according to the presently described embodiments.

With reference now to FIG. 9, the application of the presently described embodiments is illustrated. In this regard, the binary prefix tree representation 100 of the set of sequences 102 is shown with a LOES encoding 104 and a compressed LOES encoding 106. Notably, because the presently described embodiments identify a complete subtree 108 within the prefix tree 100, the root node in the encoding for that subtree 108 is denoted, for example, with a special or identifying code-point or code such as "00"—as shown at 110. It should be understood that the special or identifying code-point or code could take a variety of forms and may, in some forms, be identifiable, predetermined, detectable, unique and/or arbitrary—depending on the application and circumstances. In this manner, the encoding is reduced. For example, the LOES encoding includes 14 bits, while the compressed LOES encoding includes 10 bits. This (especially on larger scales) reduces storage requirements and increases efficiency in processing of the encoded result which, for example, may be stored, processed, or communicated as may be required by the specific application.

Figure 10A:
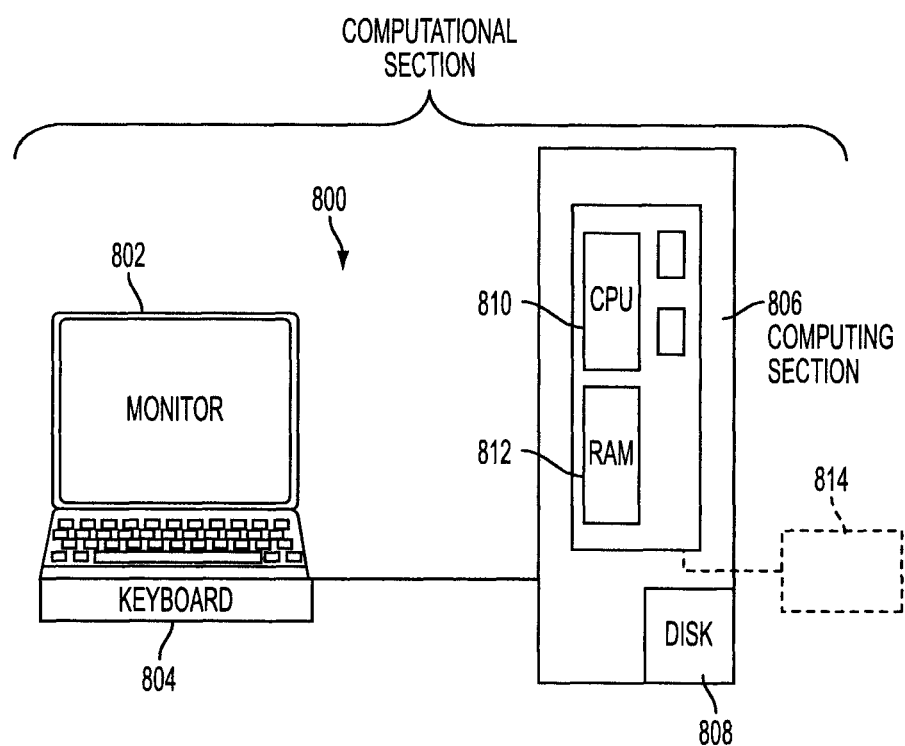
FIG. 10(a) illustrates a system in which the presently described embodiments may be implemented.
Figure 10B:
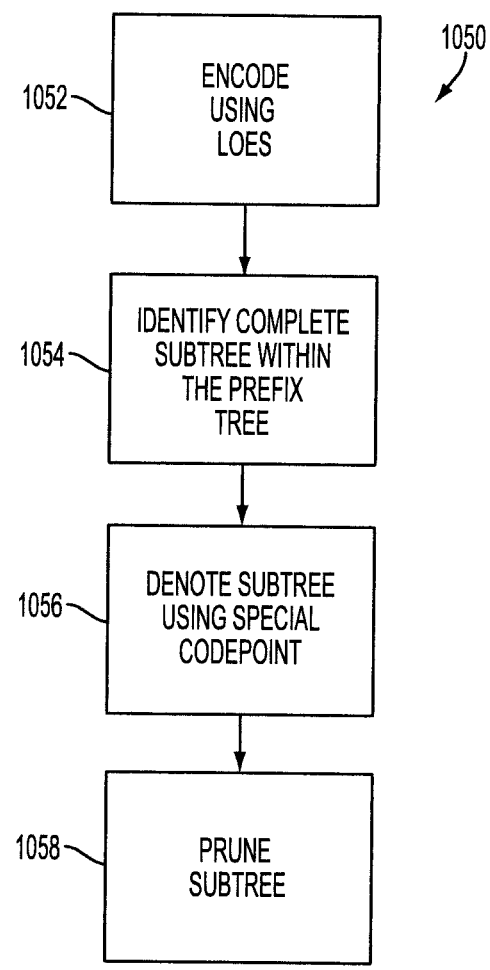
FIGS. 10(b)-10(c) are flow charts illustrating methods according to the presently described embodiments.
Figure 10C:
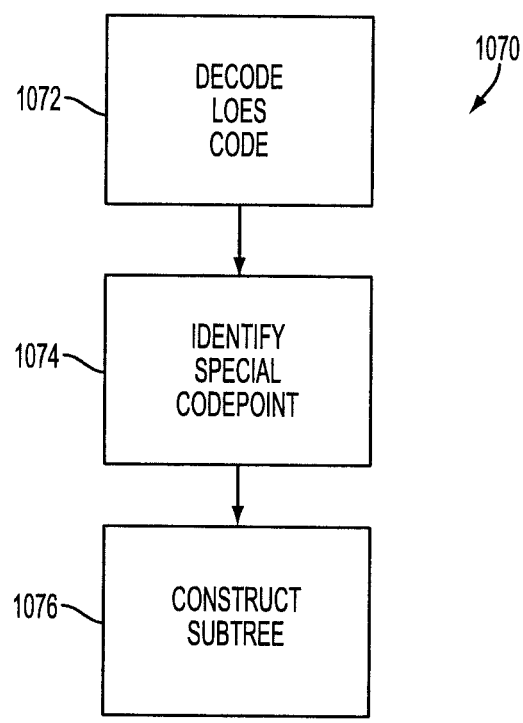

It is to be appreciated the concepts described herein may be implemented on a variety of computational systems which can perform a variety of functions, including encoding and decoding. An example of one such computational system (or electronic computing device) 800 is shown in FIG. 10(*a*), which includes, among other components, a monitor 802, keyboard 804, computing section 806 and external memory such as disk 808. Computing section 806 includes components such as a CPU, electronic processor, Graphical Processing Unit (GPU) or other computational component 810, and internal memory 812, such as a RAM. It is of course to be understood computing section 806 may include other components and may be designed in other configurations than shown here. Of course, it should be understood that this variety of implementations may include varied and different hardware configurations and/or software applications and techniques. It should be understood that, in some forms, the contemplated hardware may be configured to run software routines or execute code or instructions to achieve methods contemplated herein. Single or multiple core processors may be used, and the processors may be distributed in a network configuration. External memory 808 is considered external, as it is external to computing section 806, which results in much slower I/O operations, as compared to internal memory storage 812. Also, disk 808 may or may not be physically enclosed with computing section 806, as illustrated by optional disk 814. For example, the optional disk 814 might be a network drive. It should be appreciated that these memory devices described (or others) may be configured and operative to interact with processing and/or computing components, such as the computing section 806 and computational component 810 (including, for example, multiple core or multiple processor configurations), to allow for computer implemented methods described herein to be performed. In this regard, the memory or storage devices may be configured to improve input/output efficiency and/or may complement one another (such as external storage complementing RAM devices) to, for example, improve scalability and achieve other advantages. In this regard, the memory devices, in one form, serve as a non-transitory computer readable medium to store machine readable data and/or instructions for execution. Also, the memory or storage devices could take a variety of physical forms including solid-state forms or magnetic disk configurations.

With reference now to FIGS. 10(*b*) and 10(*c*), methods according to the presently described embodiments may be implemented on a variety of systems, including the system 800 described above. In such implementations, it should be understood that the methods, in one form, may be executed by running suitable routines on appropriate hardware systems including processors or computational components such as computing section 806, CPU or processor 810, or the like. FIG. 10(*b*) is a flow chart of an example encoding method according to the presently described embodiments. As shown, a prefix tree representing a set of states is encoded using a Level-Ordered Edge Sequence (LOES) routine (at 1052) as described herein. During the encoding, complete subtrees within the prefix trees are identified or detected (at 1054). These subtrees are then denoted in the resultant code by a special code-point (e.g. "00"). That is, a -00- is inserted in the code to represent that a complete subtree is present in the prefix tree. Then, the subtrees are pruned from the encoding (at 1058). This allows for a compressed encoding result. In at least one form, the pruning includes pruning the complete subtree, except for its root node, from the prefix tree. FIG. 10(*c*) is a flow chart of an example decoding method 1070 according to the presently described embodiments. As shown, a LOES code is decoded (at 1072). The above-noted special codes (e.g."00") are identified or detected (at 1074). As a result, any set-membership query in the prefix tree that reaches a subtree encoded by the special code is returned immediately with success (i.e. the pattern in question is a member of the set), since every possible path starting from the root of he subtree is present in the original, uncompressed prefix tree (at 1076).

Of course, it should be understood that the encoding and decoding methods or processes are incremental and/or continuing processes. So, for example, detection of a special code "00" does not necessarily end the entire decoding process—this checking and detecting is accomplished as part of the overall decoding process.

Also, it should be understood that, during the decoding upon detection of the special code, the subtree may be generated or constructed in an implicit or explicit manner. That is, in one form, the subtree is implicitly constructed whereby the success result obtained by detecting the special code (e.g. 00) alerts the system that a subtree is present in the code (and each portion of the subtree should be considered present, or a "hit," during the process) but the actual subtree is not constructed. In another form, the subtree is explicitly reconstructed or generated node-by-node with the actual path followed to each leaf node.

Empirical Evaluation

Although, as noted in connection with the system example of FIG. 10(*a*), a variety of configurations may be implemented, our evaluation setup comprised of a preprocessor for converting PDDL input files into multivalued problem descriptions is similar to Fast Downward's preprocessor. The difference is that our preprocessor outputs additional at-most-one constraints covering the problem variables. They come in the form of lists of variable-assignment tuples and are interpreted such that for any valid state, at most one of the tuples in every list holds true. For the original problem, these constraints add no additional information over what is encoded in the multi-valued description—that is, no successor of the initial state generated through the operator set will violate these constraint. The problem is that these implicit constraints are lost due to abstraction by projecting to a subset of variables.

Consider the multi-valued encoding generated by Fast Downward's (and our) preprocessor for the N-puzzles. It comprises of one variable for each tile denoting its position. There are operators for every viable pairing of the blank tile and neighboring non-blank. Each such operator has the specific positions of the blank and the tile as precondition with their switched positions as effect. As tiles start out on distinct positions in the initial state, the constraint that no two tiles can occupy the same position is implicitly upheld through the operator set. Once even a single variable is projected away (which results in the removal of its references from all operator preconditions and effects) that constraint is violated, creating a non surjective abstraction (i.e. there are viable patterns in the abstraction, that have no counterpart in the original problem).

This creates two problems. The lesser one is an often exponential increase in the size of the pattern database. The greater one is the severe reduction in quality of the resulting heuristic. If one, say, projects on 7 variables from the 15-puzzle, the resulting database will comprise 270 million patterns, but as tiles can move "through" each other will carry no more information than the manhattan distance of these 7 tiles. Note, that this does not affect admissibility of the heuristic. Evaluating these "redundant" constraints in the abstract space allows us to mitigate this problem by upholding additional constraints.

The translation process is followed by a rule based system selecting variables for one or more PDBs. Both of these components are experimental at this point which somewhat limited the scope of our evaluation. Then the PDBs would be constructed through a regression search and encoded in one of five representation forms.

Perfect Hashing (PH)

The perfect hash function maps each possible assignment vector (of the abstract problem) to a unique id given by its lexicographic rank. Ids are used for addressing packed records holding the associated values.

Binary Decision Diagram (BDD)

The PDB is stored as an inverse relation with each set represented as a BDD as described above. Common subgraphs are shared between sets. We used the buddy package, a high performance implementation from the model checking community for our evaluation.

LOES

Analogous to PH. The perfect hash function is implemented through a LOES set of all occurring patterns and its member-index function. Inverse Relation LOES (IR LOES) Analogous to BDD.

Each set is represented as a LOES. All sets use the same encoding permutation.

Inverse Relation compressed LOES (IR cLOES)

Analogous to BDD. Each set is represented as a cLOES with a specific encoding permutation.

The PDBs were then used in an A* search. The "Pipesworld Tankage", "Driverlog" and "Gripper" instances were run on a 2.2 GHz Intel Core processor running Mac OS 10.6.7 with 8 GB of memory. For the 15-Puzzle STRIPS instances, we used a 3.3 GHz Xeon processor with 4 GB of memory.

Pipesworld Tankage

Figure 11:
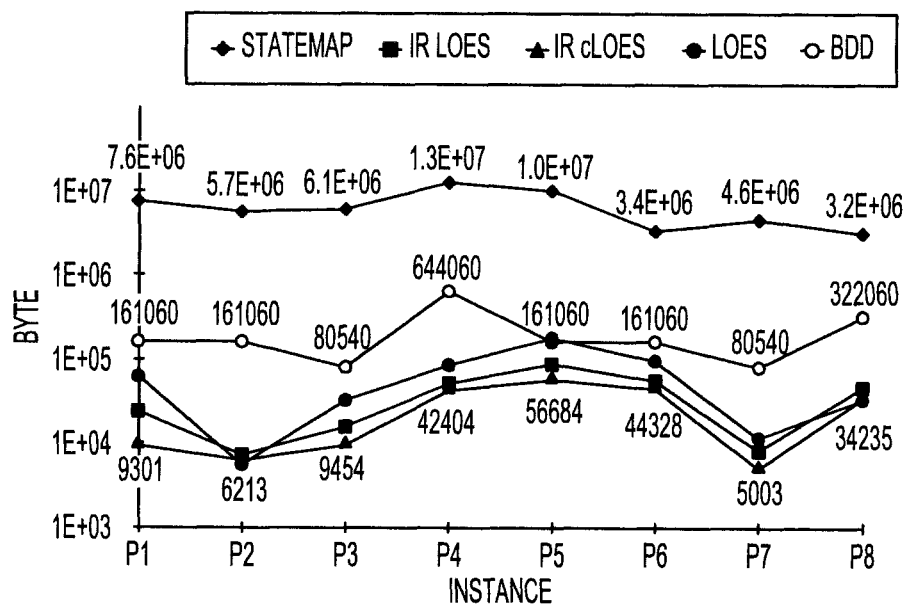
FIG. 11 shows empirical data.

The IPC4 "Pipesworld Tankage" domain models the problem of transporting oil derivatives through pipeline segments connecting areas that have limited storage capacity due to tankage restrictions for each product. The additional constraints made explicit by the preprocessor state that for any pipe, there can only be one batch that is the nearest to a source area and one batch that is the nearest to a destination area. The analysis component generated single PDBs for all instances. The PDBs are relatively small and retain a good amount of the original problem's constraints. This shows in the sizes for the different representations (see FIG. 11) where BDD outperforms PH by between one to two orders of magnitude, with the LOES versions besting this by another order of magnitude.

TABLE 1

Total PDB size, solution length and complete search time (parsing, analysis, PDB construction and search) for the "Pipesworld Tankage" (pt), "Driverlog" (dl) and "Gripper" (gr) instances.

| # | Size | sl | $t_{PH}$ | $t_{IR\,LOES}$ | $t_{IR\,cLOES}$ | $t_{LOES}$ | $t_{BDD}$ |
|---|---|---|---|---|---|---|---|
| pt1 | 67144 | 5 | 1.4 | 1.4 | 1.7 | 2.6 | 3.3 |
| pt2 | 3559 | 12 | 0.2 | 0.1 | 0.2 | 0.2 | 0.2 |
| pt3 | 38204 | 8 | 1.8 | 1.8 | 2.0 | 2.1 | 2.7 |
| pt4 | 85422 | 11 | 5.0 | 4.9 | 5.7 | 5.9 | 7.4 |
| pt5 | 212177 | 8 | 9.9 | 10.2 | 10.8 | 11.6 | 16.7 |
| pt6 | 113364 | 10 | 9.0 | 9.3 | 9.8 | 9.8 | 11.6 |
| pt7 | 13620 | 8 | 4.2 | 4.3 | 4.1 | 4.2 | 4.7 |
| pt8 | 35307 | 11 | 11.5 | 14.4 | 11.9 | 12.8 | 16.6 |
| dl1 | 30375 | 7 | 0.3 | 0.4 | 0.6 | 0.6 | 0.8 |
| dl2 | 339750 | 19 | 8.9 | 9.2 | 11.2 | 12.6 | 16.3 |
| dl3 | 1766250 | 12 | 37.4 | 35.7 | 38.5 | 51.3 | 75.2 |
| dl4 | 2466625 | 16 | 125.5 | 118.0 | 120.7 | 151.9 | 179.4 |
| dl5 | 1800000 | 18 | 54.9 | 55.5 | 57.1 | 65.6 | 83.5 |
| dl6 | 4478976 | 11 | 266.5 | 267.7 | 267.3 | 594.2 | 352.0 |
| dl7 | 3779136 | 13 | 333.1 | 337.7 | 334.7 | 359.4 | 417.9 |
| gr1 | 600 | 11 | 0.0 | 0.0 | 0.0 | 0.0 | 0.0 |
| gr2 | 4604 | 17 | 0.0 | 0.1 | 0.1 | 0.1 | 0.2 |
| gr3 | 30320 | 23 | 0.4 | 0.6 | 1.2 | 1.0 | 1.4 |
| gr4 | 181428 | 29 | 3.6 | 3.9 | 8.1 | 7.5 | 9.9 |
| gr5 | 1016072 | 35 | 28.5 | 25.9 | 37.3 | 52.3 | 63.6 |
| gr6 | 1460128 | 41 | 51.7 | 63.7 | 78.2 | 90.4 | 190.5 |
| gr7 | 1975008 | 47 | 136.6 | 237.8 | 277.8 | 206.3 | 746.3 |
| gr8 | 2582788 | 53 | 574.9 | 1187.4 | 1346.0 | 757.7 | 3751.0 |

Figure 12:
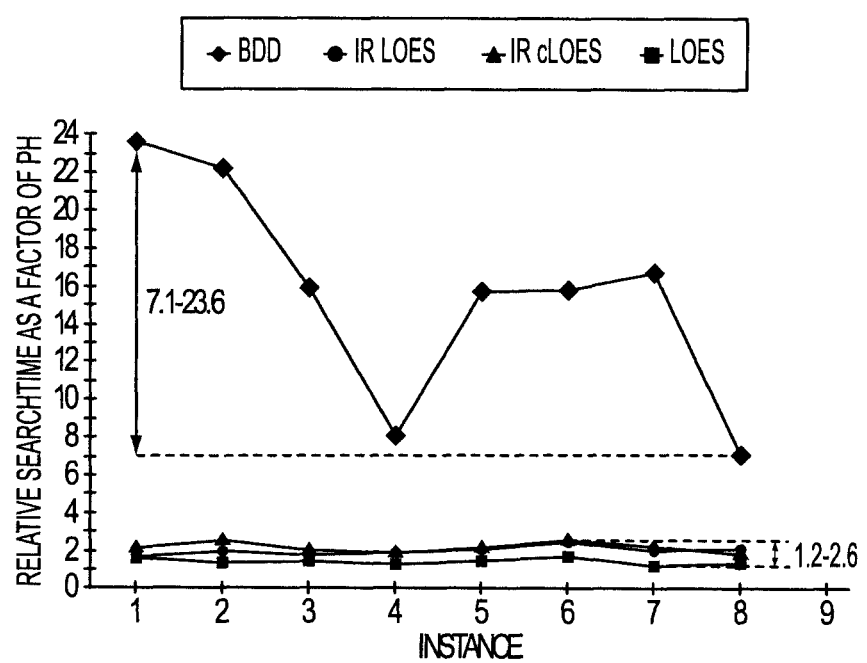
FIG. 12 shows empirical data.

On the time dimension (see FIG. 12), LOES only performs marginally worse than PH while the IR variants take about twice as long. BDD performance varies considerably and performs a good order of magnitude worse than PH and the LOES encodings.

Driverlog

Figure 13:
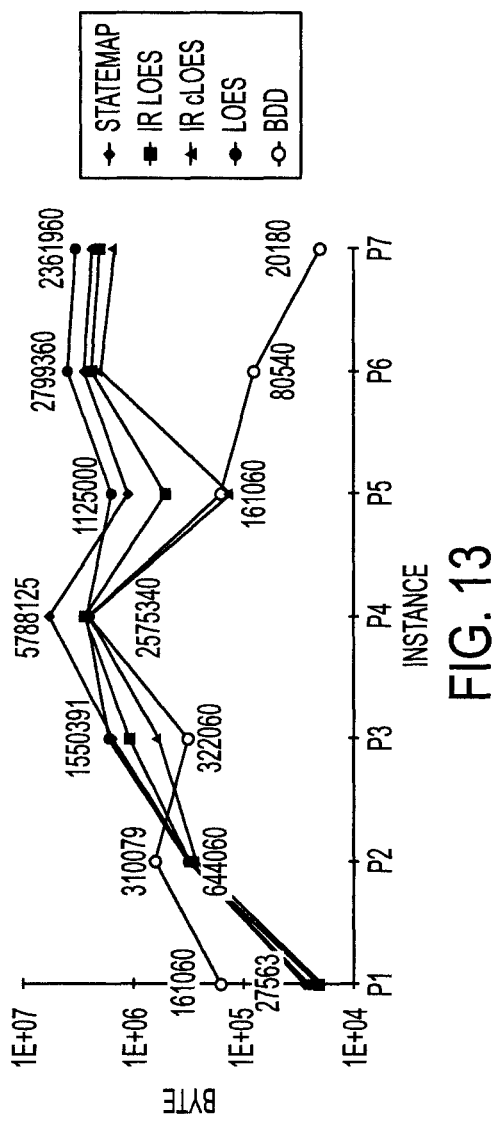
FIG. 13 shows empirical data.
Figure 14:
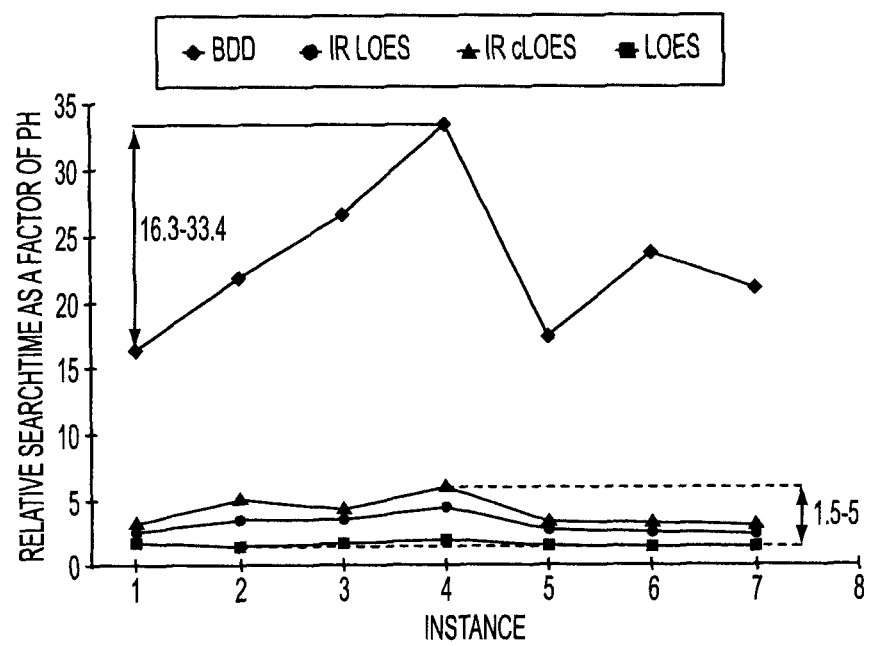
FIG. 14 shows empirical data.

"Driverlog" is an example where our preprocessing fails to uncover any explicit constraints over those encoded in the multi-valued variables. This results in PDBs comprising of all possible abstract patterns with very low quality. It is also a domain that is quite amendable to BDD representation. This shows in the space comparison (see FIG. 13), where the BDD shines on the large, multi-million pattern instances (that are scarcely subdivided by the IR representation), actually taking up an order of magnitude less space than on the smaller instances. Remarkably, the IR LOES variants still manage to outperform PH by a factor of two to three. LOES predictably performs worse as its packed store is nearly the same size as PHs (the difference stems from the fact, that it can omit storing the largest equal-value subset of patterns in PBD and denote the corresponding value as its default). The runtime comparison (see FIG. 14) paints a similar picture, as the representations' look-up cost is similar to the "Pipesworld Tankage" instances.

Gripper

Figure 15:
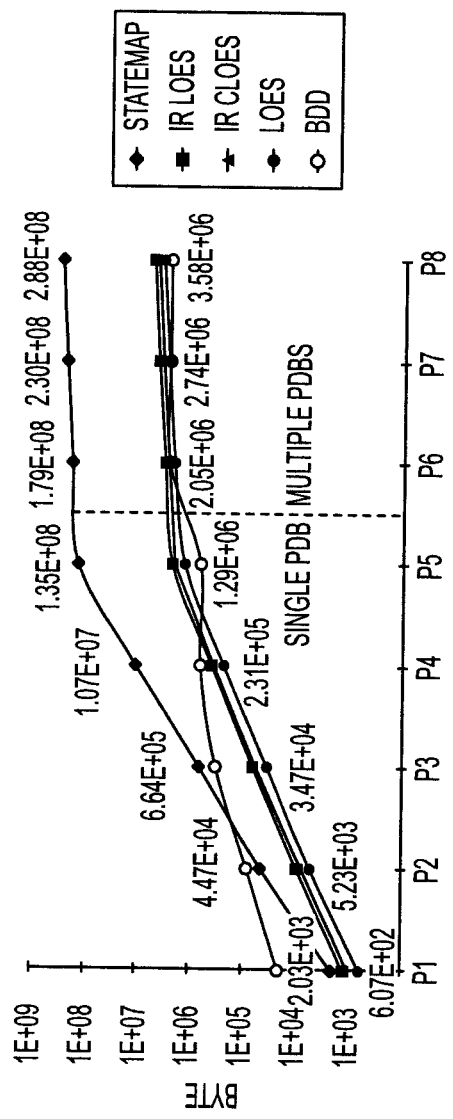
FIG. 15 shows empirical data.

The "Gripper" domain models a mobile robot that can use its two grippers to pick up and put down balls, in order to move them from one room to another. In this domain, the preprocessor picked up the implicit constraint that no object can be in both grippers at the same time. The variable selection logic constructed PDBs comprising of the fluents for the gripper states, the location of the robot and goal qualified balls. A rule was in place that would split PDBs as the abstract state space grew too large. As the multiple resulting PDBs were not additive they were combined by taking the maximum of their heuristic values. This happened beginning with instance 6, mitigating the grow of the PDBs (see FIG. 15).

Figure 16:
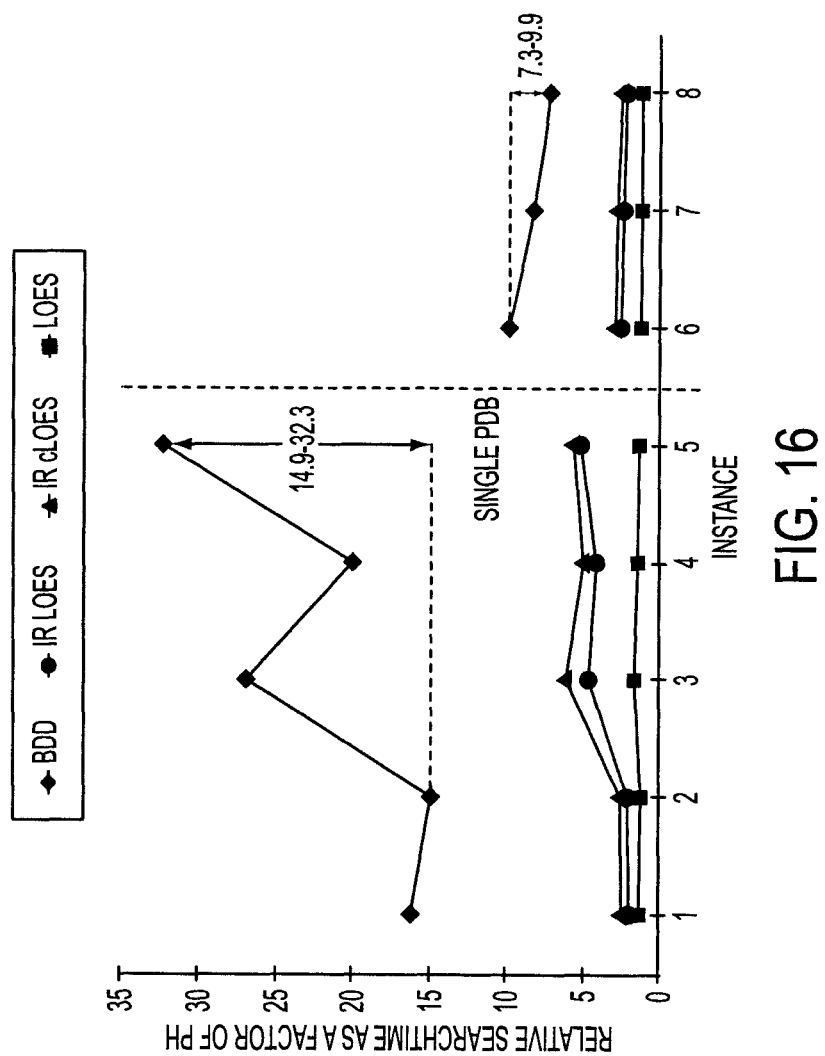
FIG. 16 shows empirical data.

"Gripper" is one of the domains where BDDs are known to perform extremely well. Still it outperformed IR cLOES in storage efficiency only in instances 5 and 8, when the PDBs where about 1 and 2.6 million patterns in size. PH consistently required around 2 orders of magnitude more storage on the larger instances. The runtime comparison (see FIG. 16) paints an interesting picture. For the smaller PDBs, PH is about 1.3 (LOES) to 5 (IR cLOES) times faster than the LOES versions. As the pattern databases grow the advantages from the quick addressing shrink considerably, probably due to increased cache misses. Again the more complex matching in BDDs is a good order of magnitude slower.

15-Puzzle

The 15-Puzzle is a classic combinatorial search benchmark. It is also a token problem for PDB heuristics. Our preprocessor here manages to extract constraints ensuring that no two tiles can occupy the same position. Also the analysis component manages to extract multiple, additive PDBs by excluding the blank and selecting tiles up to its pattern space size limit (up to 6 variables in this domain, hence an additive 6-6-3 PDB). Note that these PDBs are still noticeably weaker than the handcrafted and blank-compressed additive PDBs typically employed in domain-specific sliding-tile puzzle solvers. We run our planner over Korf's 100 random instances (Korf, R., Depth-first Iterative-Deepening: An Optional Admissible Search Tree, Artificial Intelligence (1985)), which are challenging for domain-independent planners (e.g., the state-of-the-art Fast Downward planner using M&S heuristic with an abstraction size of 10K nodes cannot solve the easiest instance within 96 GB of RAM). It is also a permutation problem, which is known to be problematic for the type of redundancy-elimination techniques employed by LOES and BDDs. We ran all instances with a hard 30 minute cut-off timer. Table 2 gives the results. Here PH fared best, thanks to its very quick PDB lookups. While the LOES variants offered a noticeable relative reduction in PDB size, the absolute differences were relatively small. The results would probably change if the analysis component allowed larger PDBs (to the detriment of the BDD based representation).

TABLE 2

Number of instance solved, PDB size and relative search speed over Korf's hundred 15-puzzle instances.

| Rep. | #$_{solved}$ | size (MB) | $\frac{t_x}{t_{PH}}$ |
|---|---|---|---|
| PH | 91 | 20.0 | 1.00 |
| BDD | 40 | 117.6 | 0.11 |
| IR LOES | 82 | 11.4 | 0.36 |
| IR cLOES | 70 | 9.6 | 0.23 |
| LOES | 68 | 11.2 | 0.49 |

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for encoding state sets comprising:
encoding, by an electronic computing device, a prefix tree representation of a set of states as a level ordered edge sequence (LOES) which encodes each inner tree node from left to right, and top to bottom order as bit pairs;
identifying, by the electronic computing device, a presence of a complete subtree having a root node within the prefix tree;
denoting, by the electronic computing device, the root node of the subtree using a special two-bit code-point inserted in the encoding to represent the complete subtree within the prefix tree; and
compressing the encoding by pruning the complete subtree.

2. The method as set forth in claim 1 wherein the special code-point is "00".

3. The method as set forth in claim 1 wherein the pruning comprises pruning the complete subtree, except for its root node, from the prefix tree.

4. The method as set forth in claim 1 wherein the prefix tree is based on a pattern database.

5. A system configured to encode state sets comprising:
an electronic computing device having a memory storage and an electronic processor, wherein the electronic processor is configured to:
encode a prefix tree representation of a set of states as a level ordered edge sequence (LOES) which encodes each inner tree node from left to right, and top to bottom order as bit pairs;
identify a presence of a complete subtree having a root node within the prefix tree;
denote the root node of the subtree using a special two-bit code-point inserted in the encoding to represent the complete subtree within the prefix tree; and
compress the encoding by pruning the complete subtree.

6. The system as set forth in claim 5 wherein the special code-point is "00".

7. The system as set forth in claim 5 wherein the electronic computing device is operative to prune the complete subtree, except for its root node, from the prefix tree.

8. The system as set forth in claim 5 wherein the prefix tree is based on a pattern database.

9. A method for decoding state sets comprising:
decoding by an electronic computing device, a level ordered edge sequence (LOES) code for a binary prefix tree of a set of states;
identifying, by the electronic computing device, a presence of a special, inserted two-bit code-point denoting a root node of, and representing, a complete subtree within the prefix tree;
returning, by the electronic computing device, a success result indicating a presence of the subtree of the prefix tree based on the identifying of the presence of the code-point; and
constructing, by the electronic computing device, the complete subtree in an implicit or explicit manner.

10. The method as set forth in claim 9 wherein the special code-point is "00".

11. The method as set forth in claim 9 wherein the prefix tree is based on a pattern database.

12. A system configured to decode state sets comprising:
an electronic computing device having a memory storage and an electronic processor, wherein the electronic processor is configured to:
decode a level ordered edge sequence (LOES) code for a prefix tree representing a set of states;
identify a presence of a special, inserted two-bit code-point denoting a root node of, and representing, a complete subtree within the prefix tree;
return a success result indicating a presence of the subtree of the prefix tree based on the identifying of the presence of the code-point; and construct the complete subtree in an implicit or explicit manner.

13. The system as set forth in claim 12 wherein the special code-point is "00".

14. The system as set forth in claim 12 wherein the prefix tree is based on a pattern database.

* * * * *